J. BERG.
ADJUSTABLE DRIVE FOR SPEEDOMETERS.
APPLICATION FILED DEC. 22, 1917.
1,300,329.
Patented Apr. 15, 1919.
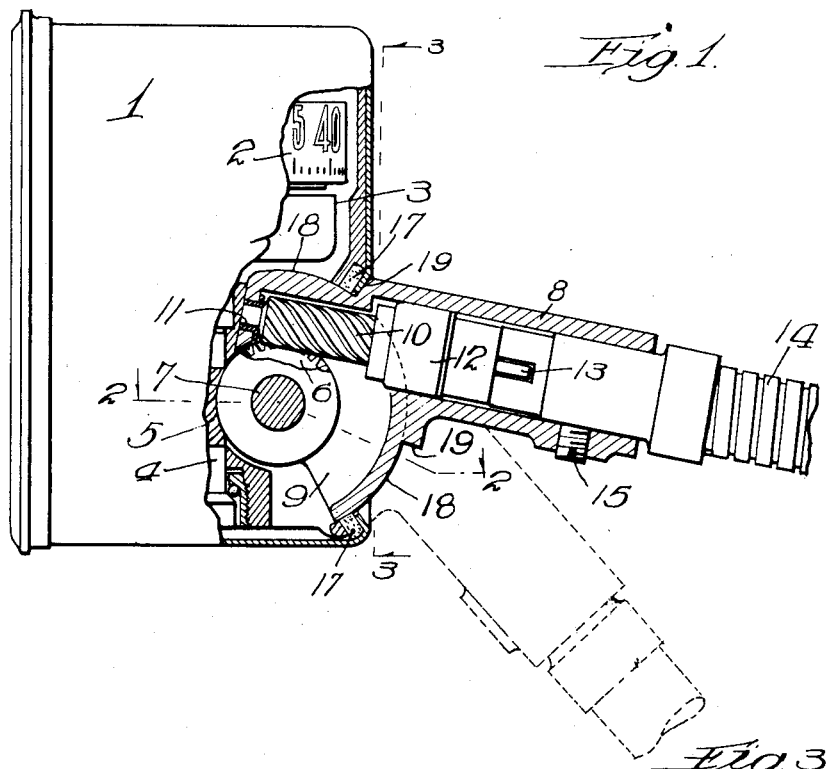
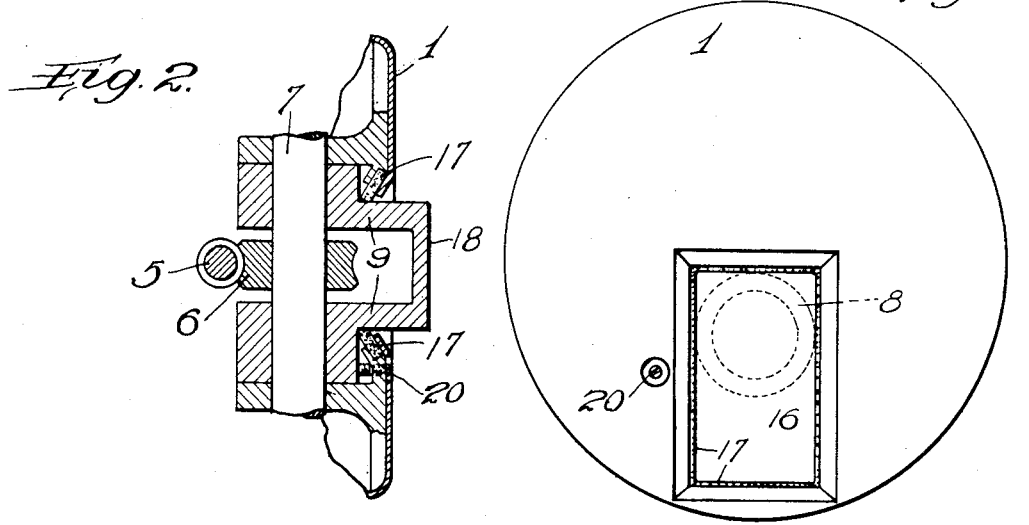
Inventor:
Joseph Berg,
by Burton & Burton
his Attys.

UNITED STATES PATENT OFFICE.

JOSEPH BERG, OF CHICAGO, ILLINOIS, ASSIGNOR TO STEWART-WARNER SPEEDOMETER CORPORATION, OF CHICAGO, ILLINOIS, A CORPORATION OF VIRGINIA.

ADJUSTABLE DRIVE FOR SPEEDOMETERS.

1,300,329.     Specification of Letters Patent.     Patented Apr. 15, 1919.

Application filed December 22, 1917. Serial No. 208,421.

*To all whom it may concern:*

Be it known that I, JOSEPH BERG, a citizen of the United States, residing at Chicago, in the county of Cook and the State of Illinois, have invented certain new and useful Improvements in Adjustable Drives for Speedometers, of which the following is a specification, reference being had to the accompanying drawings, forming a part thereof.

This invention relates to a speedometer or similar instrument adapted to be carried in an instrument board of a vehicle and to be driven by a flexible shaft connected with a road wheel or other rotating part of the vehicle and in which such flexible shaft is arranged to extend obliquely in a vertical plane from the rear of the instrument casing, and is provided with a range of adjustment for varying its obliquity. The invention consists in certain features and elements and their combination hereinafter described and shown in the drawings as indicated by the claims.

In the drawings:

Figure 1 is a side elevation partly in section, showing a speedometer provided with drive connections embodying this invention.

Fig. 2 is a section taken as indicated at line 2—2 on Fig. 1.

Fig. 3 is a section taken as indicated at line 3—3 on Fig. 1, but amounting to a rear elevation of the casing with the drive shaft removed therefrom.

Referring first to Fig. 1 it will be seen that within the casing, 1, of the instrument there is shown the usual rotary scale dial, 2, and magnet, 3, whose rotation causes rotary deflection of the scale dial, 2, for indication of speed in a well understood manner. The shaft, 4, to which the magnet, 3, is fixed, is provided with a worm gear, 5, and an idler gear, 6, rotatably mounted on shaft, 7, is shown meshing with said worm, 5. Within a housing, 8, whose flanges, 9, pivotally engage the shaft, 7, for hinging said housing, 8, to the main casing, 1, there is journaled a worm shaft, 10, provided with an end bearing, 11, and further journaled in a bushing, 12, secured in said housing, 8. The worm, 10, meshing with idler gear, 6, thus serves to drive the shaft, 4.

Through the usual style of coupling, 13, a flexible shaft of any desired construction carried in a flexible casing, 14, transmits motion from any chosen rotary element of the vehicle to the drive shaft, 10, said casing, 14, being coupled to the housing, 8, and secured thereto by a set screw, 15. By virtue of the hinged connection of the housing, 8, to the casing, 1, consisting of a pivotal engagement of the hinges, 9, with shaft, 7, and by virtue of the fact that the drive is transmitted entirely through the idler gear, 6, on said shaft, 7, it becomes possible to adjust the housing, 8, and worm shaft, 10, journaled therein through an angular range permitted by the extent of the window, 16, formed in the back wall of the casing, 1. Said window is lined with a strip, 17, of felt or similar material for excluding dust from the interior of the casing, 1, and the segmental surfaces, 18, of the housing, 8, being concentric with the shaft, 7, will remain in contact with such dust strip, 17, throughout the range of adjustment, while stop shoulders, 19, on the housing, 8, serve to limit the range of such adjustment by abutting respectively the upper and lower margins of the window, 16. At any intermediate position of the housing, it may be secured by means of a set screw, 20, threaded into the back wall of the casing, 1, in position to impinge upon a portion of the housing, 8, within the said casing.

By this construction it becomes possible to supply speedometers with a standard length of flexible shafting, even though the various makes of vehicles for which they are intended may differ widely in the matter of distance between the instrument board on which the speedometer is to be carried, and the rotating part which is chosen for deriving motion of such speedometer. Although in many cases the flexibility of the flexible drive shaft will give a wide range of accommodation, the angular adjustment of housing, 8, and its shaft, 10, will permit such accommodation with much less severe curvature of the flexible shaft, and thus serve to greatly increase the efficiency and life of the shaft in service.

I claim:

1. In a speedometer comprising a casing and a rotary shaft journaled therein, a drive shaft and a housing therefor, pivotally connected to said casing for angular adjustment of the shaft relatively to the latter, and a gear within the casing operatively connecting said drive shaft with the said rotary shaft, said gearing being arranged to remain in mesh throughout the range of said adjustment.

2. In a speedometer comprising a casing and a rotary shaft journaled therein, a drive shaft and a support in which it is journaled connected to said casing for rotative adjustment relative thereto, gears on said drive shaft and rotary shaft respectively, and an idler gear journaled to rotate about the axis of said adjustment of the drive shaft support, and meshing with said gears.

3. In a speedometer comprising a casing and a rotary shaft journaled therein, a drive shaft and a support in which it is journaled hinged to said casing for angular adjustment relatively thereto, and means operatively connecting said drive shaft and rotary shaft throughout the range of such angular adjustment.

4. In a speedometer comprising a casing a rotary shaft journaled therein and provided with a gear, a drive shaft entering the casing and also provided with a gear, and an idler gear mounted to transmit rotation from the drive shaft gear to the speedometer shaft gear, together with a sleeve in which the end portion of said drive shaft is journaled, the casing wall being formed with an aperture and the sleeve terminating in a segmental shield disposed within the casing and closing said aperture, said sleeve being pivotally connected in the casing for rotative adjustment about the axis of the said idler gear, and the segmental shield being of sufficient angular extent to cover the casing aperture throughout the range of adjustment of the sleeve and drive shaft journaled therein.

5. In combination with a casing, a shaft to be rotated therein having its axis transverse to the direction from which the drive shaft must extend to enter the casing, and substantially parallel to the plane in which said drive shaft must be pivoted for angular adjustment with respect to the casing, a journal bearing for the drive shaft pivoted to the casing for swinging in a plane substantially parallel to said shaft to be rotated therein, the drive shaft journaled in said bearing; gears on said shafts respectively within the casing and an idler gear intermeshing with both said gears and journaled in the casing with its axis coincident with the axis of the pivot of the journal bearing to the casing.

In testimony whereof I have hereunto set my hand at Chicago, Illinois, this 30th day of November, 1917.

JOSEPH BERG.